United States Patent
Karayannis et al.

[11] Patent Number: 6,051,524
[45] Date of Patent: Apr. 18, 2000

[54] OLEFIN POLYMERIZATION AND COPOLYMERIZATION CATALYST

[75] Inventors: Nicholas M. Karayannis; Steven A. Cohen, both of Naperville; Julie L. Ledermann, Geneva, all of Ill.

[73] Assignee: BP Amoco Corporation, Chicago, Ill.

[21] Appl. No.: 08/052,574

[22] Filed: Apr. 22, 1993

Related U.S. Application Data

[63] Continuation-in-part of application No. 07/808,098, Dec. 16, 1991, abandoned.

[51] Int. Cl.[7] .................................................... B01U 31/00
[52] U.S. Cl. .......................... 502/113; 502/120; 502/121; 502/123; 502/124; 502/126; 502/127
[58] Field of Search ................................. 502/113, 120, 502/127, 121, 123, 124, 126

[56] References Cited

U.S. PATENT DOCUMENTS

| | | | |
|---|---|---|---|
| 4,866,022 | 9/1989 | Arzoumanidis et al. | 502/120 |
| 4,946,816 | 8/1990 | Cohen et al. | 502/126 |
| 5,104,838 | 4/1992 | Fujita et al. | 502/108 |
| 5,204,303 | 4/1993 | Korvenoja et al. | 502/125 |
| 5,221,650 | 6/1993 | Buehler | 502/104 |

*Primary Examiner*—Elizabeth D. Wood
*Attorney, Agent, or Firm*—Wallace L. Oliver

[57] ABSTRACT

A solid, hydrocarbon-insoluble, catalyst component useful in polymerizing olefins containing magnesium, titanium, and halogen further contains an internal electron donor comprising

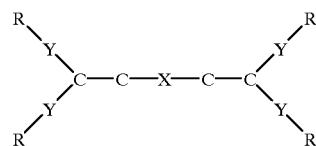

wherein R is selected from $C_1$–$C_8$ alkyl, $C_6$–$C_9$ aryl or $C_1$–$C_8$ alkoxy groups; and wherein X and Y are N-R', O, P(O)(OR'), P(O)R', or S, and R' is selected from hydrogen, $C_1$–$C_8$ alkyl and alkoxy, and $C_6$–$C_9$ aryl groups, provided that up to two Y groups may be $CR'_2$ groups.

20 Claims, No Drawings

OLEFIN POLYMERIZATION AND COPOLYMERIZATION CATALYST

CROSS-REFERENCE TO RELATED APPLICATIONS

This application is a continuation-in-part of U.S. Ser. No. 07/808,098, filed Dec. 16, 1991, now abandoned the specification and claims of which are incorporated by reference herein.

BACKGROUND OF THE INVENTION

This invention relates to a catalyst component and a catalyst system which is useful for the stereoregular polymerization or copolymerization of alpha-olefins and more particularly concerns a magnesium-containing supported titanium-containing catalyst component which contains an advantageous modifier system.

Use of solid, transition metal-based, olefin polymerization catalyst components is well known in the art including such solid components supported on a metal oxide, halide or other salt such as widely-described magnesium-containing, titanium halide-based catalyst components. Such catalyst components are referred to as "supported." Although many polymerization and copolymerization processes and catalyst systems have been described for polymerizing or copolymerizing alpha-olefins, it is advantageous to tailor a process and catalyst system to obtain a specific set of properties of a resulting polymer or copolymer product. For example, in certain applications, a combination of high activity, stereospecificity are required together with polymer characteristics such as good morphology, desired particle size distribution, acceptable bulk density and the like.

Typically, supported catalyst components useful for polymerizing propylene and higher olefins as well as for polymerizing propylene and higher olefins with a minor amount of ethylene contain an electron donor component as an internal modifier. Such internal modifier is an integral part of the solid supported component as is distinguished from an external electron donor component, which together with an aluminum alkyl component, comprises the catalyst system. Typically, the external modifier and aluminum alkyl are combined with the solid supported component shortly before the combination is contacted with an olefin monomer.

Selection of the internal modifier can affect catalyst performance and the resulting polymer formed from a catalyst system. As stated above, it is advantageous and an advance in the art to discover internal modifiers including combinations of modifiers which, when incorporated into a supported catalyst, produce-desired effects on the polymerization process and the polymer produced.

Generally, organic electron donors have been described as useful in preparation of the stereospecific supported catalyst components including organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors have been described as useful in incorporating into supported catalyst components.

Examples of organic electron donors are described in commonly assigned U.S. Ser. No. 07/731,499, filed Jul. 17, 1991, incorporated by reference herein. Other examples of other electron donor systems include those described in U.S. Pat. Nos. 4,971,937, 5,068,213, 5,095,153, and 5,106,807, as well as published European application EP 0 452 156. These references generally describe classes of diethers useful as electron donor components. Other electron donors are described in U.S. Pat. Nos. 3,642,746, 4,186,107, 4,473,660, 4,522,930, 4,565,798, 4,693,990, 4,814,312, 4,829,034, and 4,904,628.

Numerous individual processes or process steps have been disclosed to produce improved supported, magnesium-containing, titanium-containing, electron donor-containing olefin polymerization or copolymerization catalysts. For example, Arzoumanidis et al., U.S. Pat. No. 4,866,022, incorporated by reference herein, discloses a method for forming an advantageous alpha-olefin polymerization or copolymerization catalyst or catalyst component which involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor.

Arzoumanidis et al., U.S. Pat. No. 4,540,679, incorporated by reference herein, discloses a process for the preparation of a magnesium hydrocarbyl carbonate by reacting a suspension of a magnesium alcoholate in an alcohol with carbon dioxide and reacting the magnesium hydrocarbyl carbonate with a transition metal component.

Arzoumanidis et al., U.S. Pat. No. 4,612,299, incorporated by reference herein, discloses a process for the preparation of a magnesium carboxylate by reacting a solution of a hydrocarbyl magnesium compound with carbon dioxide to precipitate a magnesium carboxylate and reacting the magnesium carboxylate with a transition metal component.

In addition, polymer or copolymer morphology often is critical and typically depends upon catalyst morphology. Good polymer morphology generally involves uniformity of particle size and shape, resistance to attrition and an acceptably high bulk density. Minimization of very small particles (fines) typically is very important especially in gas-phase polymerizations or copolymerizations in order to avoid transfer or recycle line pluggage. Therefore, it is highly desirable to develop alpha-olefin polymerization and copolymerization catalysts and catalyst components that have good morphology, and in particular, a narrow particle size distribution. Another property which is important commercially is the maintenance of an acceptably high bulk density.

SUMMARY OF THE INVENTION

A solid, hydrocarbon-insoluble, catalyst component useful in polymerizing olefins containing magnesium, titanium, and halogen further contains an internal electron donor comprising

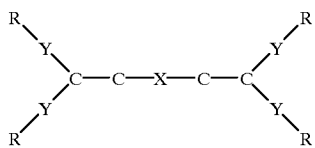

wherein R is selected from $C_1$–$C_8$ alkyl, $C_6$–$C_9$ aryl or $C_1$–$C_8$ alkoxy groups; and wherein X and Y are N-R', O, P(O)(OR'), P(O)R', or S, and R' is selected from hydrogen, $C_1$–$C_8$ alkyl and alkoxy, and $C_6$–$C_9$ aryl groups, provided that up to two Y groups may be CR'$_2$ groups.

BRIEF DESCRIPTION OF THE INVENTION

Supported catalyst components of this invention contain at least one internal electron donor comprising

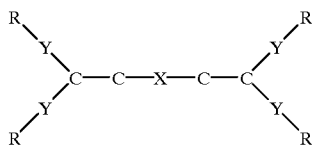

wherein R is selected from $C_1$–$C_8$ alkyl, $C_6$–$C_9$ aryl or $C_1$–$C_8$ alkoxy groups; and wherein X and Y are N-R', O, P(O)(OR'), P(O)R', or S, and R' is selected from hydrogen, $C_1$–$C_8$ alkyl and alkoxy, and $C_6$–$C_9$ aryl groups, provided that up to two Y groups may be CR'$_2$ groups.

In a preferable embodiment, the supported catalyst components of this invention contain at least one internal electron donor comprising

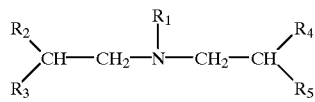

wherein $R_1$ is selected from hydrogen, $C_1$–$C_8$ alkyl and alkoxy, and $C_6$–$C_8$ aryl groups; $R_2$ and $R_4$ are selected from $C_1$–$C_8$ alkoxy groups; and $R_3$ and $R_5$ are selected from $C_1$–$C_8$ alkyl and alkoxy groups.

In a more preferred embodiment, $R_1$ is a $C_1$–$C_4$ alkyl group and $R_2$, $R_3$, $R_4$, and $R_5$ are selected from $C_2$–$C_4$ alkoxy groups.

The most preferred electron donor system of this invention comprises N,N-bis-(2,2-diethoxyethyl)-methylamine.

Such internal electron donor material is incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds.

The preferred solid, hydrocarbon-insoluble catalyst or catalyst component of this invention for the stereoregular polymerization or copolymerization of alpha-olefins comprises the product formed by a process, which comprises a first step of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is used, the magnesium-containing species is a hydrocarbyl carbonate or a carboxylate. When sulfur dioxide is employed, the resulting magnesium-containing species is an hydrocarbyl sulfite (ROSO$_2$–) or an hydrocarbyl sulfinate (RSO$_2$–).

Generally, magnesium hydrocarbyl carbonate is prepared by reacting carbon dioxide with a magnesium alcoholate. For example, magnesium hydrocarbyl carbonate is formed by suspending magnesium ethoxide in ethanol and adding carbon dioxide until the magnesium ethoxide dissolves forming magnesium ethyl carbonate. If, however, the magnesium ethoxide were suspended in 2-ethylhexanol, magnesium 2-ethylhexyl carbonate, magnesium ethyl carbonate and magnesium ethyl/2-ethylhexyl carbonate may be formed. If the magnesium ethoxide is suspended in a liquid hydrocarbon or halohydrocarbon which is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as:

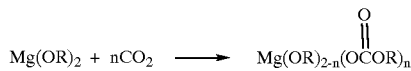

wherein n is a whole number or fraction up to 2, and wherein R is a hydrocarbyl group of 1 to 20 carbon atoms. In addition, a magnesium alcoholate-containing two different aforesaid hydrocarbyl groups may be employed. From the standpoint of cost and availability, magnesium alcoholates which are preferred for use according to this invention are those of the formula Mg(OR)$_2$ wherein R is as defined below. In terms of catalytic activity and stereospecificity, best results are achieved through the use of magnesium alcoholates of the formula Mg(OR')$_2$ wherein R' is an alkyl radical of 1 to about 8 carbon atoms, an aryl radical of 6 to about 12 carbon atoms or an alkaryl or aralkyl radical of 7 to about 12 carbon atoms. Magnesium ethoxide is most preferred.

Specific examples of magnesium alcoholates that are useful according to this invention include: Mg(OCH$_3$)$_2$, Mg(OC$_2$H$_5$)$_2$, Mg(OC$_4$H$_9$)$_2$, Mg(OC$_6$H$_5$)$_2$, Mg(OC$_6$H$_{13}$)$_2$, Mg(OC$_9$H$_{19}$)$_2$, Mg(OC$_{10}$H$_7$)$_2$, Mg(OC$_{12}$H$_9$)$_2$, Mg(OC$_{12}$H$_{25}$)$_2$, Mg(OC$_{16}$H$_{33}$)$_2$, Mg(OC$_{18}$H$_{37}$)$_2$, Mg(OC$_{20}$H$_{41}$)$_2$, Mg(OCH$_3$)(OC$_2$H$_5$), Mg(OCH$_3$)(OC$_6$H$_{13}$), Mg(OC$_2$H$_5$)(OC$_8$H$_{17}$), Mg(OC$_6$H$_{13}$)(OC$_{20}$H$_{41}$), Mg(OC$_3$H$_7$)(OC$_{10}$H$_7$), Mg(OC$_2$H$_4$Cl)$_2$ and Mg(OC$_{16}$H$_{33}$)(OC$_{18}$H$_{37}$). Mixtures of magnesium alcoholates also may be used if desired.

A suitable magnesium hydrocarbyl alcoholate has the formula MgR(OR') wherein R and R' are as defined hereinabove for the magnesium alcoholate. When alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. However, when the suspending medium does not contain alcohol, the magnesium hydrocarbyl alcoholate reacts with carbon dioxide as:

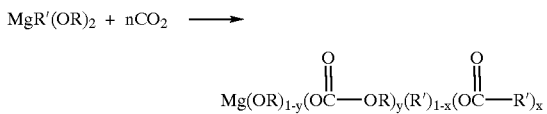

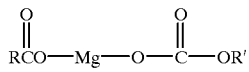

wherein $y+x=n\geq 2$ and $y=0$ for $x=n\leq 1.0$.
In the case of $y+n=2$, $$\text{RCO}-\text{Mg}-\text{O}-\overset{\overset{\text{O}}{\|}}{\text{C}}-\text{OR}'$$

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

If the hydrocarbyl magnesium compound contains two hydrocarbyl groups, the reaction is represented as:

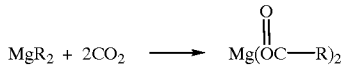

where R is as defined for X-MgR.

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{13})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR_2$ wherein R is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Most preferably, the magnesium-containing compound is a magnesium alcoholate, and the resulting magnesium-containing species is a magnesium hydrocarbyl carbonate.

For example, a magnesium alcoholate may be used which is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation. Use as the magnesium-containing compound of a magnesium alcoholate produced in this manner affords a solution of the magnesium-containing species which has a substantially reduced viscosity.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and the like; haloalkanes such as 1,1,2-trichloroethane, carbon tetrachloride, and the like; aromatics such as xylenes and ethylbenzene; and halogenated and hydrogenated aromatics such as chlorobenzene, o-dichlorobenzene, tetrahydronaphthalene and decahydronaphthalene.

The solution of the magnesium-containing species typically comprises at least one monohydroxy alcohol containing from 2 to about 18 carbon atoms, preferably at a ratio of the total number of moles of the at least one alcohol to the number of moles of the aforesaid magnesium-containing compound in the range of from about 1.45:1, more preferably from about 1.6:1, to about 2.3:1, more preferably to about 2.1:1. Alcohols that are suitable for use in the present invention include those having the structure HOR wherein R is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used, such as ethanol, 1-or 2-propanol, t-butyl alcohol, cyclohexanol, 2-ethylhexanol, amyl alcohols including isoamyl alcohol, and branched alcohols having 9 to 12 carbon atoms. Preferably, 2-ethylhexanol or ethanol is employed.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Typically, approximately 0.3 to 4 moles of $CO_2$ are added to the solution or suspension of the magnesium-containing compound with stirring at a temperature of about 0 to 100° C. over a period of approximately 10 minutes to 24 hours.

Irrespective of which of the aforesaid magnesium-containing compounds is used to form the magnesium-containing species, solid particles are precipitated from the aforesaid solution of the magnesium-containing species by treatment with a transition metal or Group IV halide and preferably additionally with a morphology controlling agent. The transition metal or Group IV halide preferably is a titanium (IV) or silicon halide and more preferably is titanium tetrachloride. While any convenient conventional morphology controlling agent can be employed, organosilanes are particularly suitable for use as the morphology controlling agent. Suitable organosilanes for this purpose include those having a formula: $R_nSiR'_{4-n}$, wherein n=0 to 4 and wherein R is hydrogen or an alkyl, alkoxy, haloalkyl or aryl radical containing one to about ten carbon atoms, or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an -OR radical containing one to four carbon atoms. A suitable organosilane may contain different R' groups. Mixtures of organosilanes may be used. Preferable organosilanes include tri-methylchlorosilane, trimethylethoxysilane, dimethyidichlorosilane, tetraethoxysilane, and hexamethyldisiloxane.

Broadly, in accordance with this invention, the precipitated particles are treated with a transition metal compound and an electron donor. Suitable transition metal compounds which can be used for this purpose include compounds represented by the formula $T_aY_bX_{c-b}$ wherein $T_a$ is a transition metal selected from Groups IV-B, V-B and VI-B of the Periodic Table of Elements, Y is oxygen, OR' or $NR'_2$; wherein each R' is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of c-b being from at least 1 up to the value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, and the like.

In addition to supported catalyst components formed from magnesium alcoholates or magnesium hydrocarbyl carbonates as described above, other magnesium-containing supported components may be produced by reacting titanium halide-containing compounds with magnesium halides, such as magnesium chloride, magnesium oxyhalides, magnesium alkoxides, and the like. In preparation of suitable supported catalysts useful for olefin polymerization, an electron donor material is added during formation of such component in which a magnesium compound is reacted with a titanium halide-containing compound as described in the art. Irrespective of the method of formation, the supported catalyst components of this invention include the internal electron donor material described in this invention.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

The particles formed as described above, the titanium halide component, and the electron donor components described in this invention are reacted at temperatures ranging from about −10° C. to about 170° C., generally over a period of several minutes to several hours, and are contacted in amounts such that the atomic ratio of titanium to magnesium components in the reaction mixture (calculated as magnesium in magnesium compound from which the magnesium-containing species is formed) is at least about 0.5:1. Preferably, this ratio ranges from about 0.5:1 to about 20:1. Greater amounts of titanium may be employed without adversely affecting catalyst component performance, but typically there is no need to exceed a titanium to magnesium ratio of about 20:1. More preferably, the titanium to magnesium ratio ranges from about 2:1 to about 15:1 to ensure that the catalyst components contain sufficient titanium to exhibit good activities without being wasteful of the titanium compound employed in preparation. The electron donor components are employed in a total amount ranging up from about 1.0 mole per gram atom of titanium in the titanium compound, and preferably from about 0.001 to about 0.6 mole per gram atom of titanium in the titanium compound. Best results are achieved when this ratio ranges from about 0.01 to about 0.3 mole per gram atom of titanium.

Preferably, the aforesaid electron donor compounds and titanium compound is contacted with the precipitated solid particles in the presence of an inert hydrocarbon or halogenated diluent, although other suitable techniques can be employed. Suitable diluents are substantially inert to the components employed and are liquid at the temperature and pressure employed.

Preferably, although optional, the precipitated particles are reprecipitated from a solution containing, typically, a cyclic ether, and then the reprecipitated particles are treated with a transition metal compound and an electron donor as described above In a typical reprecipitation procedure, the precipitated particles are entirely solubilized in a cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles. Also, thioethers such as tetrahydrothiophene can be used. In some instances, such as the use of 2,2,5,5-tetrahydrofuran and tetrahydropyran-2-methanol, reprecipitation occurs upon heating to about 55°–85° C. Other compounds may be used which act in an equivalent manner, i.e., materials which can solubilize the particles formed in Step B and from which solid uniform particles can be reprecipitated, such as cyclohexene oxide, cyclohexanone, ethyl acetate and phenyl acetate. Mixtures of such suitable materials may also be used.

A suitable diluent that can be used in any of the aforesaid steps should be substantially inert to the reactants employed and preferably is liquid at the temperatures and pressures used. A particular step may be conducted at an elevated pressure so that lower boiling diluents can be used at higher temperatures. Typical suitable diluents are aromatic or substituted aromatic liquids, although other hydrocarbon-based liquids may be used. Aromatic hydrocarbons, such as toluene, and substituted aromatics are useful. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G® which is a $C_{10}$-average isoparaffinic hydrocarbon boiling at 156–176° C. Other examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-di-chlorobenzene.

Each of the aforesaid preparative steps is conducted in the substantial absence of water, oxygen, carbon monoxide, and other extraneous materials capable of adversely affecting the performance of the catalyst or catalyst component of this invention. Such materials are conveniently excluded by carrying out the procedures in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation steps, there is obtained a solid reaction product suitable for use as a catalyst or catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the final solid reaction product prepared may be contacted with at least one Lewis acid prior to polymerization. Such Lewis acids useful according to this invention are materials which are liquid or soluble in a liquid diluent at treatment temperatures and have a Lewis acidity high enough to remove impurities such as unreacted starting materials and poorly affixed compounds from the surface of the solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl4$, $GeCl_4$, $SnCl_4$, $PCl_3$ and $SbCl_5$. Preferable Lewis acids are $TiCl_4$ and $SiC_4$. Mixtures of Lewis acids can be employed if desired. Such Lewis acid may be used in a compatible diluent.

Although not required, the final solid reaction product may be washed with an inert liquid hydrocarbon or halogenated hydrocarbon before contact with a Lewis acid. If such a wash is conducted, it is preferred to substantially remove the inert liquid prior to contacting the washed solid with Lewis acid.

In an advantageous procedure, the precipitated particles are treated with titanium tetrachloride and then with titanium tetrachloride in the presence of the mixture of electron donors. More preferably, the product is treated one or more times with a liquid aromatic hydrocarbon such as toluene and finally with titanium tetrachloride again.

In a preferable embodiment of this invention, a mixture of electron donors is incorporated into the supported catalyst component comprising a first electron donor and a second electron donor. The first electron donor is selected from the group of electron donors described above as representing the class of electron donors of this invention. The second electron donor is a dialkylphthalate wherein each alkyl group may be the same or different and contains from 3 to 5 carbon atoms. Preferably the second electron donor is an o-dialkylphthalate. The second electron donor is preferably a dibutylphthalate and more preferably is di-n-butylphthalate or di-i-butylphthalate.

The mole ratio of the second electron donor to the first electron donor may range from about 0.1:1 to about 20:1. When the mole ratio of the aforesaid second electron donor to the first electron donor is in the range of from about 0.3:1 to about 1:1, the resulting catalyst or catalyst component is particularly effective in producing a poly-alpha-olefin, in particular polypropylene, that has reduced stereoregularity and a lower melting point. When the mole ratio of the aforesaid second electron donor to the first electron donor is in the range of from about 3:1 to about 20:1, and especially from about 6:1 to about 12:1, the resulting catalyst or catalyst component typically has a relatively enhanced catalytic activity for the stereoregular polymerization or copolymerization of alpha-olefins.

In addition to the aforesaid second and first electron donor components, the internal electron donor material useful in this invention may be combined with additional electron donors such as a polyhydrocarbyl phosphonate, phosphinate, phosphate or phosphine oxide or an alkyl aralkylphthalate, wherein the alkyl moiety contains from 2 to 10, preferably 3 to 6, carbon atoms and the aralkyl moiety contains from 7 to 10, preferably to 8, carbon atoms, or an alkyl ester of an aromatic monocarboxylic acid wherein the monocarboxylic acid moiety contains from 6 to 8 carbon atoms and the alkyl moiety contains from 1 to 3 carbon atoms.

Useful polyhydrocarbyl phosphonates, phosphinates, phosphates, or phosphine oxides include:

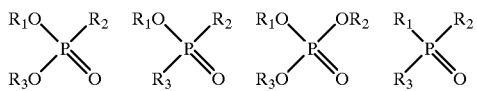

wherein each hydrocarbyl group ($R_1$, $R_2$, and $R_3$) may be the same or different and may be alkyl or aryl, and each contains from 1 to 12 carbon atoms Preferably each hydrocarbyl group ($R_1$, $R_2$ and $R_3$) is an alkyl group. Preferably a phosphonate is employed. Particular phosphonates that are suitable for use as an aforesaid preferable component include dimethyl methylphosphonate, diethyl ethylphosphonate, diisopropyl methylphosphonate, dibutylbutylphosphonate, and di(2-ethylhexyl) 2-ethylhexyl phosphonate.

The additional component also may be a dialkylphthalate wherein each alkyl moiety may be the same or different and each contains at least 6 carbon atoms, preferably up to 10 atoms. Particular dialkylphthalates which are suitable for use as an additional electron donor include dihexylphthalate and dioctylphthalate.

Also, the additional component may be an alkyl ester of an aliphatic monocarboxylic acid wherein carboxylic acid moiety contains 2 to 20, preferably 3 to 6, carbon atoms and the alkyl moiety contains from 1 to 3 carbon atoms. Particular alkyl esters that are suitable for use as the aforesaid first electron donor include methyl valerate, ethyl pivalate, methyl pivalate, methyl butyrate, and ethyl propionate.

In another alternative, the additional component may be a dicycloaliphatic ester of an aromatic dicarboxylic acid wherein each cycloaliphatic moiety may be the same or different and each contains from 5 to 7 carbon atoms, and preferably contains 6 carbon atoms. Preferably the ester is a dicycloaliphatic diester of an ortho aromatic dicarboxylic acid. Particular dicydoaliphatic esters that are suitable for use as the aforesaid first electron donor include dicyclopentylphthalate, dicyclohexylphthalate, and di-(methylcyclopentyl)-phthalate.

The additional component may be an alkyl aralkyl phthalate wherein the alkyl moiety contains 2 to 10, preferably 3 to 6, carbon atoms, and the aralkyl moiety contains from 7 carbon atoms up to 10, preferably up to 8, carbon atoms. Particularly, alkyl aralkyl phthalates suitable for use as an additional component include benzyl n-butyl phthalate and benzyl i-butyl phthalate. In another alternative, such additional component also may be an alkyl ester of an aromatic monocarboxylic acid wherein the monocarboxylic acid moiety contains from 6 to 8 carbon atoms and the alkyl moiety contains from 1 to 3 carbon atoms. Particular alkyl esters that are suitable for use as an additional component include methyl toluate, ethyl toluate, methyl benzoate, ethyl benzoate and propyl benzoate.

The mole ratio of first electron donor component described in this invention to the additional component is in the range of from about 0.5:1, preferably from about 1:1, to about 3:1, preferably to about 2.5:1. The mole ratio of the aforesaid second electron donor to the combination of the first electron donor and the additional electron donor ranges from about 4:1, preferably from about 7:1, to about 15:1, preferably to about 9:1.

Typically, when used alone as a single electron donor in the method of this invention, individual members of the aforesaid classes from which the first electron donor is selected produces a catalyst which is not as effective in producing a homopolymer or copolymer of an alpha-olefin either with improved catalytic activity—in other words, higher polymer yield—or with a reduced stereoregularity of the resulting homopolymer or copolymer at an acceptably high yield and with suitable levels of extractables and solubles. To achieve the full benefits of the present invention, a member of the first electron donors should be used in conjunction with at least one of the aforesaid second electron donors. Furthermore, a combination of only an aforesaid second electron donor with a member of the aforesaid additional components produces a catalyst which typically is not as effective in producing a homopolymer or copolymer of an alpha-olefin either with improved catalytic activity or with a reduced stereoregularity of the resulting homopolymer or copolymer. However, a combination of electron donors describe in this invention typically is effective in producing a catalyst produces the benefits of production of a homopolymer or copolymer either with greater catalytic activity and with homopolymer or copolymer having reduced stereoregularity.

Preferably, the mole ratio of the second electron donor component to the first electron donor component is at least 3:1, and preferably is at least 4:1 when an additional electron donor is used combination with the first electron donor component.

Although the chemical structure of the catalyst or catalyst components of this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine.

In the solid catalyst component of this invention produced by the method of this invention, the atomic ratio of magnesium to titanium is at least about 0.3:1 and preferably, is from about 0.4:1 to about 20:1 and more preferably, from about 3:1 to about 9:1.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Typically, the catalyst or catalyst component of this invention is used in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H13)2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. A magnesium, zinc, or aluminum alkyl containing 1 to about 6 carbon atoms per alkyl radical may be used. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, diethylaluminum hydride, diisobutylaluminum hydride, and the like.

A typical catalyst system for the polymerization or copolymerization of alpha olefins is formed by combining the supported titanium-containing catalyst or catalyst component of this invention and an alkyl aluminum compound as a co-catalyst, together with at least one external modifier which typically is an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

To optimize the activity and stereospecificity of this cocatalyst system, it is preferred to employ one or more modifiers, typically electron donors, and including compounds such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chloroberizoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiY_4$, wherein each Y group is the same or different and is an alkyl or alkoxy group containing 1 to about 20 carbon atoms. Preferred silanes include isobutyltrimethoxysilane, diisobutyldimethoxysilane, diisopropyidimethoxysilane, dicyclohexyl-dimethoxysilane, diphenyldimethoxysilane, di-t-butyidimethoxysilane, and t-butyftrimethoxysilane.

The catalyst or catalyst component of this invention is useful in the stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 30 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

The amount of the catalyst or catalyst component of this invention to be used varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° C. to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLES

A series of supported catalyst components were prepared using various mixtures of internal electron donors. Examples using electron donors of this invention are described below, together with Comparative Runs not using such internal electron donors.

Step A—Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution (1530 milliliters) was transferred to a two-liter bottle. The solution contained 0.10 gram-equivalents of magnesium ethoxide per milliliter.

Step B—Formation of Solid Particles

Into a 1.0-liter reactor was charged 150 milliliters of toluene, 20.5 milliliters of tetraethoxysilane and 14 milliliters of titanium tetrachloride under a blanket of dry nitrogen. After the mixture was stirred at 300 rpm at 22–27° C. for 15 minutes, 114 milliliters of the Step A magnesium hydrocarbyl carbonate solution was added to the reactor through a bomb and thereafter solid particles precipitated.

Step C—Reprecipitation

After the mixture containing the precipitate was stirred for five additional minutes, 27 milliliters of tetrahydrofuran (THF) were added rapidly through a syringe. The temperature in the reactor rose from 26° C. to 38° C. Whereupon, the stirring was maintained at 300 rpm and the temperature was increased to 60° C. within 15 minutes. The first formed solid dissolved in the THF solution. Within about 5 minutes after the THF addition, a solid began to reprecipitate from solution. Stirring was continued for 1 hour at 60° C. after which agitation was stopped and the resulting solid was allowed to settle. Supernatant was decanted and the solid washed two times with 50-milliliter portions of toluene.

Step D—Titanium (IV) Compound Treatment

To the solid from Step C in the one-liter reactor were added 125 milliliters of toluene and 50 milliliters of titanium tetrachloride. The resulting mixture was heated to 116° C. within 30 minutes and stirred at 300 rpm for one hour. After stirring was stopped, the resulting solid was allowed to settle and the supernatant was decanted. After 150 milliliters of toluene, 50 milliliters of titanium tetrachloride, the electron donor compounds were added to the resulting solid, the mixture was stirred at 300 rpm at 117° C. for 90 minutes, the solid was allowed to settle and supernatant liquid was decanted. After 95 milliliters of toluene were added, the mixture was heated to 91° C. for 30 minutes. After the agitation was stopped, the solid was allowed to settle and the supernatant decanted. An additional 125 milliliters of titanium tetrachloride were added, the mixture heated at 91° C. under agitation for 30 minutes, after which the agitation was stopped, and the supernatant liquid was decanted. The residue was washed four times with 50-milliliter portions of hexane and the solids recovered. The mole ratio of magnesium/titanium/electron donor components in the reactants for the examples was 1/5/0.45.

Batch slurry phase propylene polymerization evaluation was performed in a two liter reactor at 71° C. at a total reactor pressure of 150 pounds per square inch gauge with 7 millimoles of hydrogen, while stirring at 500 revolutions per minute with a reaction time of 2 hours. Triethylaluminum (TEA) was used as a co-catalyst together with diisobutyldimethoxysilane as an external modifier. The reactor was charged with TEA/modifier, titanium component, hydrogen, and propylene in that order. The conditions employed and results obtained are summarized in Table 1. In Table 1, E.D. means electron donor. "Yield" (grams of polymer produced per gram of solid catalyst component) was based on the weight of solid catalyst used to produce polymer. "Solubles" were determined by evaporating the solvent from an aliquot of the filtrate to recover the amount of soluble polymer produced and are reported as the weight percent (% Sol.) of such soluble polymer based on the sum of the weights of the solid polymer isolated by filtration and of the soluble polymer. "Extractables" were determined by measuring the loss in weight of a dry sample of ground polymer after being extracted in boiling n-hexane for three to six hours and are reported as the weight percent (% Ext.) of the solid polymer removed by the extraction. The bulk density (BD) is reported in units of pounds per cubic foot. The viscosity of the solid polymer was measured and reported as the melt flow rate (MFR) in grams of polymer per 10 minutes.

Data for Examples 1 –7 and Comparative Runs A-S are shown in Table 1.

The data described in Table 1 show that, under comparable conditions, use of a catalyst component incorporating an internal electron donor of this invention demonstrates superior activity and stereospecificity for polymerization of propylene.

TABLE I

| | Electron Donor (ml) | | | | | | | | |
|---|---|---|---|---|---|---|---|---|---|
| Example (Run) | E.D of Invention[1] | Di-n-Butyl Phthalate | Additional E.D. | E.D. Mole Ratio[2] | Yield (gPP/gcat) | Sol. (wt. %) | Ext. (wt. %) | Bulk Den. (lb/ft$^3$) | MFR (g/10 min.) |
| 1 | 0.22 | 2.15 | 0 | 1/9/0 | 27,220 | 0.5 | 1.03 | 26.6 | 4.1 |
| 2 | 1.2 | 1.2 | 0 | 1/1/0 | 12,465 | 1.1 | 1.43 | 26.2 | 15.0 |
| 3 | 1.4 | 1.0 | 0 | 3/2/0 | 12,170 | 3.4 | 2.24 | 26.7 | 13.7 |
| 4 | 1.7 | 0.7 | 0 | 7/3/0 | 6,360 | 4.8 | 2.55 | — | 22.5 |
| 5 | 0.22 | 2.15 | 0.12[3] | 1/8.5/0.5 | 20,000 | 0.9 | 1.18 | 28.2 | 8.5 |
| 6 | 0.11 | 2.2 | 0.12[3] | 0.5/9/0.5 | 19,430 | 0.8 | 2.47 | 27.0 | 8.1 |
| 7 | 1.1 | 0.48 | 0.72[3] | 5/2/3 | 6,170 | 9.3 | 1.67 | — | 14.2 |
| A | 0 | 2.4 | 0 | 0/10/0 | 16,670 | 1.2 | 1.30 | 26.8 | 8.1 |
| B | 0 | 2.4 | 0 | 0/10/0 | 18,370 | 0.9 | — | 27.8 | 4.7 |
| C | 1.2 | 0 | 1.2[3] | 1/0/1 | 4,890 | 14.8 | — | 20.1 | 55.5 |
| D | 0 | 2.15 | 0.16(g)[4] | 0/9/1 | 21,710 | 0.5 | 1.45 | 26.8 | 3.2 |
| E | 0 | 1.8 | 0.93[5] | 0/3/1 | 19,370 | 0.9 | 1.12 | 27.0 | 4.4 |
| F[18] | 0 | 2.1 | 0.09[6] | 0/9/1 | 14,110 | 0.4 | 1.09 | 22.4 | 3.5 |
| G | 0 | 2.15 | 0.09[6] | 0/9/1 | 20,115 | 0.7 | 1.29 | 25.4 | 7.4 |
| H | 0 | 2.15 | 0.15[7] | 0/9/1 | 20,000 | 1.1 | 1.19 | 26.1 | 7.6 |
| J | 0 | 2.1 | 0.12[8] | 0/9/1 | 21,250 | 0.6 | 1.21 | 27.2 | 4.0 |
| K | 0 | 1.8 | 0.88[9] | 0/3/1 | 20,480 | 0.6 | 1.46 | 27.1 | 2.5 |
| L[19] | 0 | 2.5 | 0.3(g)[10] | 0/9/1 | 9,830 | 0.8 | — | 26.2 | 7.8 |
| M[20] | 0 | 2.5 | 0.3[11] | 0/9/1 | 9,230 | 1.1 | — | 26.0 | 1.1 |
| N | 0 | 2.1 | 0.11[12] | 0/9/1 | 19,900 | 0.8 | 1.45 | 27.0 | — |
| O | 0 | 2.15 | 0.11[13] | 0/9/1 | 19,305 | 1.0 | 1.55 | 27.0 | 7.2 |
| P | 0 | 1.8 | 0.4[14] | 0/3/1 | 14,350 | 1.30 | 2.18 | — | 15.3 |
| Q | 0 | 2.1 | 0.11[15] | 0/9/1 | 12,910 | 0.9 | 1.63 | 27.4 | 6.5 |
| R | 0 | 2.1 | 0.14[16] | 0/9/1 | 20,125 | 0.8 | 1.22 | 24.3 | 4.7 |
| S | 0 | 2.1 | 0.16(g)[17] | 0/9/1 | 19,895 | 0.3 | 0.92 | 27.2 | 6.7 |

[1]N,N-bis-(2,2-diethoxyethyl)-methylamine
[2]Mole ratio of First ED/Second ED/Additional ED
[3]Benzyl-n-butylphthalate
[4]2,6-Di-t-butyl-4-methylpyridine
[5]Bis-2-(ethylhexyl)-2-ethylhexylphosphonate
[6]Piperidine
[7]Tetramethylpiperidine
[8]2,3-Dimethoxytoluene
[9]Dioctylphthalate
[10]Dicyclohexylphthalate
[11]Bis-2-methoxyethylphthalate
[12]Ethylpivalate
[13]Methylvalerate
[14]Ethyl-1-methylpipecolinate
[15]Ethylnicotinate
[16]Ethyldiethoxyacetate
[17]Methyl-3,5-dimethoxybenzoate
[18]0.524 wt. % naphthalene in Step B
[19]1.0 wt. % naphthalene in Step B
[20]0.75 wt. % naphthalene in Step B

What is claimed is:

1. A solid, hydrocarbon-insoluble, magnesium-containing, titanium-containing, supported catalyst component useful for stereoregular polymerization or copolymerization of alpha-olefins which contains from about 0.001 to about 0.6 mole per gram atom of titanium and a first internal electron donor comprising:

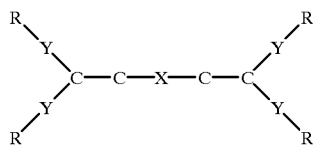

wherein R is selected from $C_1$–$C_8$ alkyl, $C_6$–$C_9$ aryl or $C_1$–$C_8$ alkoxy groups; and wherein X and Y are N-R', O, P(O)(OR'), P(O)R', or S, and R' is selected from hydrogen, $C_1$–$C_8$ alkyl and alkoxy, and $C_6$–$C_9$ aryl groups, provided that up to two Y groups may be $CR'_2$ groups.

2. The catalyst component of claim 1 which contains a second internal electron donor comprising a dialkylphthalate wherein each alkyl group contains from 3 to 5 carbon atoms.

3. The catalyst component of claim 2 wherein the second electron donor is o-di-n-butylphthalate or o-di-i-butylphthalate.

4. The catalyst component of claim 1 which contains a first internal electron donor comprising:

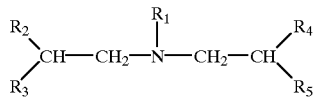

wherein $R_1$ is selected from hydrogen, $C_1$–$C_8$ alkyl and alkoxy, and $C_6$–$C_8$ aryl groups; $R_2$ and $R_4$ are selected from $C_1$–$C_8$ alkoxy groups; and $R_3$ and $R_5$ are selected from $C_1$–$C_8$ alkyl and alkoxy groups.

5. The catalyst component of claim 4 which contains a second internal electron donor comprising a dialkylphthalate wherein each alkyl group contains from 3 to 5 carbon atoms.

6. The catalyst component of claim 5 wherein the second electron donor is o-di-n-butylphthalate or o-di-i-butylphthalate.

7. The catalyst component of claim 1 which contains a first internal electron donor comprising N,N-bis-(2,2-diethoxyethyl)-methylamine.

8. The catalyst component of claim 7 which contains a second internal electron donor comprising a dialkylphthalate wherein each alkyl group contains from 3 to 5 carbon atoms.

9. The catalyst component of claim 8 wherein the second electron donor is o-di-n-butylphthalate or o-di-i-butylphthalate.

10. A catalyst component of claim 1 which is a product formed by:
   forming a solution of a magnesium-containing species in a liquid, wherein the magnesium-containing species is formed by reacting a magnesium-containing compound with carbon dioxide or sulfur dioxide;
   precipitating solid particles from the solution of the magnesium-containing species by treating said magnesium-containing species with a transition metal compound or halide of a Group IV element; and
   treating the precipitated particles with a titanium tetrahalide compound and the first electron donor.

11. The catalyst component of claim 10 in which the first electron donor comprises N,N-bis-(2,2-diethoxyethyl)-methylamine.

12. The catalyst component of claim 11 which contains a second internal electron donor comprising a dialkylphthalate wherein each alkyl group contains from 3 to 5 carbon atoms.

13. The catalyst component of claim 12 wherein the second electron donor is o-di-n-butylphthalate or o-di-i-butylphthalate.

14. The catalyst component of claim 2 which contains an additional electron donor selected from the group consisting of:

(1) a polyhydrocarbyl phosphonate, phosphinate, phosphate or phosphine oxide wherein each hydrocarbyl group may be the same or different and may be alkyl or aryl, and each contains from 1 to 12 carbon atoms and at a mole ratio of up to about 20:1 of the aforesaid first electron donor to the phosphonate, phosphinate, phosphate or phosphine oxide;

(2) alkyl aralkylphthalate wherein the alkyl moiety contains from 2 to 10 carbon atoms and the aralkyl moiety contains from 7 to 10 carbon atoms; or (3) an alkyl ester of an aromatic monocarboxylic acid having an aromatic monocarboxylic acid moiety containing from 6 to 8 carbon atoms and an alkyl moiety containing from 1 to 3 carbon atoms.

15. The catalyst component of claim 14 which contains a first internal electron donor comprising N,N-bis-(2,2-diethoxyethyl)-methylamine.

16. The catalyst component of claim 15 which contains a second internal electron donor comprising a dialkylphthalate wherein each alkyl group contains from 3 to 5 carbon atoms.

17. The catalyst component of claim 16 wherein the second electron donor is o-di-n-butylphthalate or o-di-i-butylphthalate.

18. The catalyst component of claim 2 wherein the mole ratio of the second electron donor to the first electron donor is about 6:1 to about 12:1.

19. The catalyst component of claim 6 wherein the mole ratio of the second electron donor to the first electron donor is about 6:1 to about 12:1.

20. The catalyst component of claim 16 wherein the mole ratio of the second electron donor to the first electron donor is about 6:1 to about 12:1.

* * * * *